(12) United States Patent
Eskildsen

(10) Patent No.: US 6,369,370 B1
(45) Date of Patent: Apr. 9, 2002

(54) TABLE TOP WITH INDUCTION HEATING ELEMENTS HAVING POLE PIECES CAST IN SITU

(75) Inventor: Christian Eskildsen, Gelsted (DK)

(73) Assignee: Aktiebolaget Electrolux, Stockholm (SE)

(*) Notice: Subject to any disclaimer, the term of this patent is extended or adjusted under 35 U.S.C. 154(b) by 0 days.

(21) Appl. No.: 09/380,341
(22) PCT Filed: Mar. 13, 1998
(86) PCT No.: PCT/DK98/00099
§ 371 Date: Oct. 14, 1999
§ 102(e) Date: Oct. 14, 1999
(87) PCT Pub. No.: WO98/41064
PCT Pub. Date: Sep. 17, 1998

(30) Foreign Application Priority Data

Mar. 13, 1997 (DK) ................................ 0279/97

(51) Int. Cl.[7] ................................................. H05B 6/12
(52) U.S. Cl. .......................................... 219/621; 219/675
(58) Field of Search ................................ 219/621, 622, 219/624, 674, 675, 620

(56) References Cited

U.S. PATENT DOCUMENTS

| | | | |
|---|---|---|---|
| 3,814,888 A | * 6/1974 | Bowers et al. | 219/620 |
| 3,843,857 A | 10/1974 | Cunningham | |
| 3,928,744 A | * 12/1975 | Hibino et al. | 219/620 |
| 3,980,858 A | * 9/1976 | Hibino | 219/624 |
| 4,151,387 A | * 4/1979 | Peters, Jr. | 219/620 |
| 4,348,571 A | * 9/1982 | Dills | 219/620 |
| 4,629,843 A | * 12/1986 | Kato et al. | 219/620 |

FOREIGN PATENT DOCUMENTS

EP  0 637 898 A1  2/1995

* cited by examiner

Primary Examiner—Tu Ba Hoang
(74) Attorney, Agent, or Firm—Pearne & Gordon LLP

(57) ABSTRACT

A kitchen cooktop surface in a material of nature, such as marble may be fitted with induction heating elements providing higher efficiency than mere placing in contact with the lower side of the cooktop. According to the invention the cooktop is hollowed out from the lower side, leaving only a thin partition which is reinforced by means of casting in situ of a ferromagnetic particle loaded material. Alternatively, the top surface may be penetrated, and a central circular piece of the cooktop material may be retained by means of similar casting in situ.

6 Claims, 1 Drawing Sheet

TABLE TOP WITH INDUCTION HEATING ELEMENTS HAVING POLE PIECES CAST IN SITU

BACKGROUND OF THE INVENTION

The invention relates to a table top with integral induction heating elements fitted into the lower side of the table top.

Several types of induction heating tabletops are known, e.g. vitroceramic top plates below which there are disposed a number of induction heating elements supplied with ELF power. These traditionally comprise a flat ("pancake") coil parallel to the table top surface, and a number of radially disposed ferrite rods below which screen the radiation of ELF induction from going downwards and direct it towards the iron-containing cooking utensil above the coil. Such induction heating coil elements may also be disposed in a well in a very thick top plate, so that the distance between the coil and cooking utensil is not too large. Another solution is described in WO 94/05137, in which the coil is disposed in a core made of a type of densit concrete which is magnetically conductive and the whole assembly is cast into non-magnetic densit, forming a solid unit.

It has recently been recognized as attractive to dispose an induction heating coil element in conjunction with a material of nature, such as marble or wood. However, in particular marble is very brittle and the disposition of a well which will leave less than 5 mm of material immediately above the coil is a very complex undertaking which leads to breakage due to invisible cracks in the material of nature. Furthermore, the heating of the top surface due to transmission of heat from the cooking utensil back into the surface can lead to severe heat stresses, in particular when the cooking utensil is used as a skillet.

BRIEF SUMMARY OF THE INVENTION

The above disadvantages are avoided in a construction according to the invention which is particular in that pole pieces which are cast in situ in a ferromagnetic particle containing material constitute a magnetic coupling between the cooking utensil and the induction heating element. In practice this means that the pole pieces perform the double function of reinforcing the table top, such as a marble slab, and that the required distance between the induction heating element and the cooking utensil may be obtained.

In an advantageous embodiment of the invention the pole pieces penetrate the surface to be flush with the table top. This means that the in situ casting of the pole pieces actually retain the parts of the table top which is inside the perimeter of the pole pieces. This has the added advantage that the delimitation of the active area above the induction heating element is clearly delimited and by a material which is similarly stone-like as the marble, i.e. the densit material.

In a further advantageous embodiment of the invention the pole pieces rise slightly above the surface. This has the advantage that a very intimate contact is obtained between the cooking vessel and the magnetic circuit, without any risk of scratching the cooktop surface. Furthermore the thin layer of air below the cooking vessel creates a heat insulating layer which prevents the heating of the cooktop by conduction from the cooking vessel.

The invention is not limited to the use of e.g. magnetic densit, indeed with less hard materials of nature it may be desirable to use a resin type casting material loaded with ferromagnetic particles.

In practice, the manufacture of a marble table top with an induction heating element with no visible markings will be performed by the steps of cutting a circular well in the reverse side of the marble slab which is supported firmly, by cutting a further central depression and a circular ring, leaving only a thin partition between the bottoms of the further depression and the ring and the front side of the marble slab, by casting a ferromagnetic particle loaded material in the depression and ring, by placing a induction heating element in the well and fixing it there.

In case visible markings are desired (and a magnetic structure closer to the cooking utensil), the cutting of a well may be dispensed with, and instead a circular saw is used to cut out a cylindrical plate which is sliced to the required thickness. The part of the cylindrical plate which formed part of the marble slab surface has a central depression shaped in it, and is centered in the hole obtained by the sawing, and magnetic densit is cast around it. The central depression is similarly filled with magnetic densite. An induction heating element is subsequently fixed in contact with the magnetic densite. The firm support of the marble slab for drilling and sawing may occur by means of a heat releasable wax composition adhering firmly to the top surface of the cooktop.

The invention functions best with an induction heating element of the kind comprising a core made of magnetic densit, but the advantages of the invention are also tangible with traditional induction heating elements which have only a series of radially disposed ferrite rods below the coil.

BRIEF DESCRIPTION OF THE SEVERAL VIEWS OF THE DRAWINGS

The invention will be further described with reference to the drawing, in which.

DETAILED DESCRIPTION OF THE INVENTION

Figure 1:
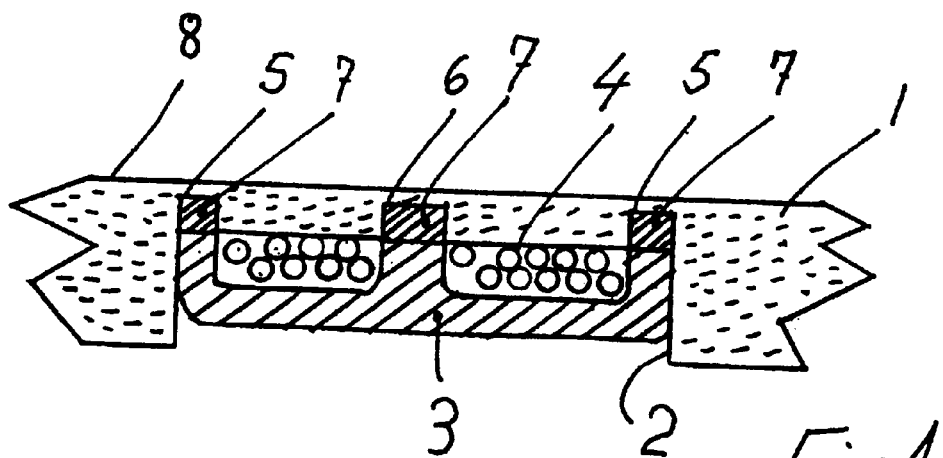
FIG. 1 shows a tabletop according to the invention with invisible induction heating means.

In FIG. 1 is shown a cooktop or kitchen table 1 with a cavity or well 2 formed into its lower side to receive an induction core-and-coil system 3 in which the windings of the coil are shown as a number of circles. In the bottom surface of the well 4 a further central cavity, depression, or well 6 is formed, as well as a circular "moat"-like channel 5. The bottom surfaces of the further excavations are fairly dose to the top surface 8 of the kitchen table plate 1 which is weakened thereby. In order to reinforce the total assembly a ferromagnetic material in paste form is cast and hardened in the very sane further excavations, so that a bridge is formed between the central parts of the material of nature and the surrounding kitchen table 1. Simultaneously, pole pieces 7 are formed, which carry the magnetic flux generated by the core-and-coil structure 3 nearer to the surface 8 of the kitchen table where pots will be placed.

Figure 2:
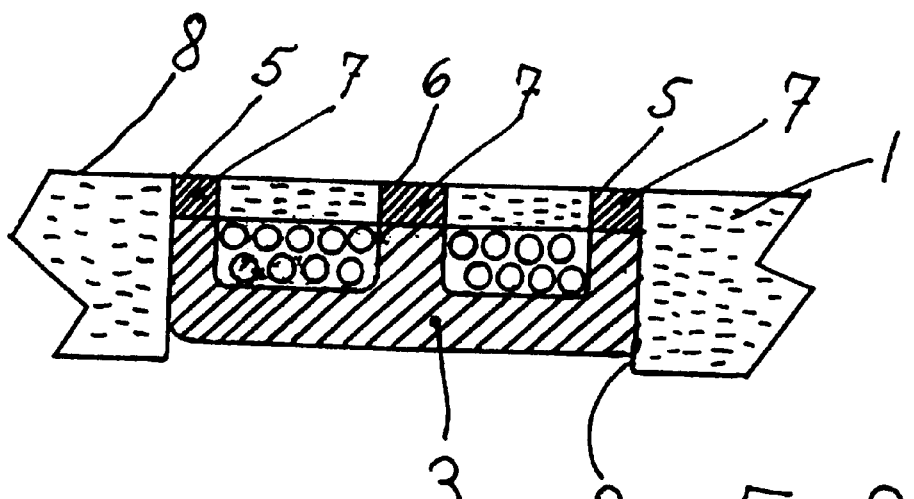
FIG. 2 shows a tabletop according to the invention in which the ring of magnetic material is visible.

In FIG. 2 is shown a structure which uses the same components as in FIG. 1 but disposed differently and with a different technical and visual effect. In this construction a cylindrical plug is cut from the kitchen table 1, leaving a cylindrical hole 2. The cylindrical plug which has a smaller diameter is sliced to obtain a slice of optional thickness which is further drilled to obtain a central hole. The cylindrical plug is oriented so that the patterning of its surface registers with the surrounding surface 8 of the kitchen table 1, and fixed at a depth so that the total surface is flat. This may occur by means of a releasable wax composition which adheres the cylindrical plug to an intermediate plate which itself is releasbly adhered to the top 8 of the kitchen table. The central hole and the ring-shaped channel created by this fixing of the cylindrical plug are filled with a settable composition comprising ferromagnetic particles. Thereby a ferromagnetic ring and a central ferromagnetic plug is obtained, acting as pole pieces 7 and simultaneously fixing the cylindrical plug in the material of nature to the kitchen table 1. The appearance of the finished kitchen table will be a ring and a center in a material which is different from the total kitchen table, but which is flush with the surface 8, thereby ensuring that cleaning of the kitchen table is not impaired. The change of the original kitchen table 1 into a kitchen table with a cooking zone is completed in that the core-and-coil induction unit structure 3 is fitted into the hole 2, so that the pole pieces 7 are in close contact with the core parts of the induction unit.

The above description has been directed essentially to the transformation of a kitchen table in a brittle material into a kitchen table with an induction cooking zone, however the same structure will be equally useful in e.g. wood or a cast plastic material which is only converted late in its process of manufacture. An essential feature would seem to lie in the use of a settable compound containing ferromagnetic particles which acts as a pole piece structure when it has hardened.

It will be obvious that any method for removing material from the original kitchen table may be used, so that the method is not limited to a circular saw, because milling may be equally adaptable.

What is claimed is:

1. A table top having an upper surface and a lower side with integral induction heating elements fitted into the lower side of the table top, characterized in that pole pieces which are cast in situ in the table top in a ferromagnetic particle containing material constitute a magnetic coupling between a cooking utensil and the induction heating elements.

2. A table top according to claim 1, characterized in that the pole pieces penetrate the upper surface of the table top and are flush with the upper surface of the table top.

3. A table top according to claim 1, characterized in that the pole pieces rise slightly above the upper surface.

4. A method for a manufacture of a table top according to claim 1 in a form of a marble slab having an upper surface and a lower surface, characterized in the steps of cutting a circular well in the lower surface of the marble slab which is supported firmly, by cutting a further central well and a circular ring, leaving only a thin partition between a bottom surface of the well and the circular ring and the upper surface of the marble slab, by casting a ferromagnetic particle loaded material in the further central well and ring, by placing a induction heating element in the well and fixing it there.

5. A method for a manufacture of a table top according to claim 1, comprising the steps of:

cutting a cylindrical plate out of the table top using a circular saw, slicing the cylindrical plate to a required thickness, centrally drilling said cylindrical plate, centering the drilled and sliced plate in a hole created by the circular saw during the step of cutting, casting a settable composition comprising ferromagnetic particles into a space created between the centered slice and the table top and into the hole created by drilling, and subsequently to the step of casting, fixing an induction heating element in contact with the settable composition comprising ferromagnetic particles.

6. A table top according to claim 1, characterized in that the lower side of the table top includes a central well and circular channel where said pole pieces are formed.

* * * * *